(12) United States Patent
Molinaro et al.

(10) Patent No.: US 10,357,865 B2
(45) Date of Patent: Jul. 23, 2019

(54) METHOD FOR BEVELLING AN OPHTHALMIC LENS

(71) Applicant: ESSILOR INTERNATIONAL (COMPAGNIE GENERALE D'OPTIQUE), Charenton-le-Pont (FR)

(72) Inventors: Andrea Molinaro, Charenton-le-Pont (FR); Sarah Boukobza, Charenton-le-Pont (FR); Marc Perrier, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 273 days.

(21) Appl. No.: 15/039,151

(22) PCT Filed: Oct. 28, 2014

(86) PCT No.: PCT/FR2014/052744
§ 371 (c)(1),
(2) Date: May 25, 2016

(87) PCT Pub. No.: WO2015/079133
PCT Pub. Date: Jun. 4, 2015

(65) Prior Publication Data
US 2017/0136597 A1 May 18, 2017

(30) Foreign Application Priority Data
Nov. 26, 2013 (FR) ..................................... 13 61661

(51) Int. Cl.
G06F 19/00 (2018.01)
B24B 9/14 (2006.01)
(Continued)

(52) U.S. Cl.
CPC ............ B24B 9/144 (2013.01); B24B 47/225 (2013.01); G05B 19/4068 (2013.01); G05B 2219/36221 (2013.01)

(58) Field of Classification Search
CPC ....... B24B 47/225; B24B 9/144; B24B 49/00; B24B 9/148; B24B 9/14; G05B 19/4068; G05B 2219/36221
See application file for complete search history.

(56) References Cited

U.S. PATENT DOCUMENTS 5,887,326 A * 3/1999 Bower ................. G02C 13/003
29/235
7,295,886 B2 11/2007 Shibata
(Continued)

FOREIGN PATENT DOCUMENTS

| EP | 1 591 199 | 11/2005 |
|---|---|---|
| EP | 2 305 423 | 4/2011 |
| FR | 2 926 896 | 7/2009 |

OTHER PUBLICATIONS

International Search Report dated Feb. 16, 2015, corresponding to PCT/FR2014/052744.

*Primary Examiner* — Thomas C Lee
*Assistant Examiner* — Zhipeng Wang
(74) *Attorney, Agent, or Firm* — Young & Thompson

(57) ABSTRACT

A method for producing an instruction for bevelling an ophthalmic lens, with a view to mounting same in a framework of a spectacle frame into which a bevelled display lens is initially fitted. The method includes the steps of: a) acquiring a correction parameter relative to the play between the framework and the display lens; b) capturing a surface image of the display lens previously removed from the framework; c) determining, on the surface image, an initial contour (C0) of the display lens; d) calculating a corrected contour (C1), by correcting the initial contour according to (Continued)

the correction parameter; and e) deriving the bevelling instruction according to the corrected contour.

17 Claims, 2 Drawing Sheets

(51) Int. Cl.
*B24B 47/22* (2006.01)
*G05B 19/4068* (2006.01)

(56) References Cited

U.S. PATENT DOCUMENTS

| | | | |
|---|---|---|---|
| 8,408,701 B2 | 4/2013 | Biton et al. | |
| 8,556,419 B2 | 10/2013 | Haddadi | |
| 2004/0039546 A1* | 2/2004 | Guillermin | B24B 9/14 702/155 |
| 2005/0251280 A1 | 11/2005 | Shibata | |
| 2006/0073772 A1* | 4/2006 | Shibata | B24B 9/148 451/52 |
| 2009/0068932 A1* | 3/2009 | Lemaire | B24B 9/148 451/43 |
| 2010/0157243 A1* | 6/2010 | Boutinon | G02C 13/005 351/159.75 |
| 2010/0309430 A1* | 12/2010 | Haddadi | B24B 9/14 351/159.75 |
| 2011/0066276 A1* | 3/2011 | Dubois | B24B 1/00 700/117 |
| 2011/0149234 A1 | 6/2011 | Biton et al. | |
| 2012/0133886 A1* | 5/2012 | Biton | B24B 9/148 351/159.74 |
| 2015/0055086 A1* | 2/2015 | Fonte | G06Q 30/0621 351/178 |
| 2015/0298278 A1* | 10/2015 | Suzue | B24B 9/148 451/5 |
| 2016/0008943 A1* | 1/2016 | Suzue | G05B 19/418 451/256 |

* cited by examiner

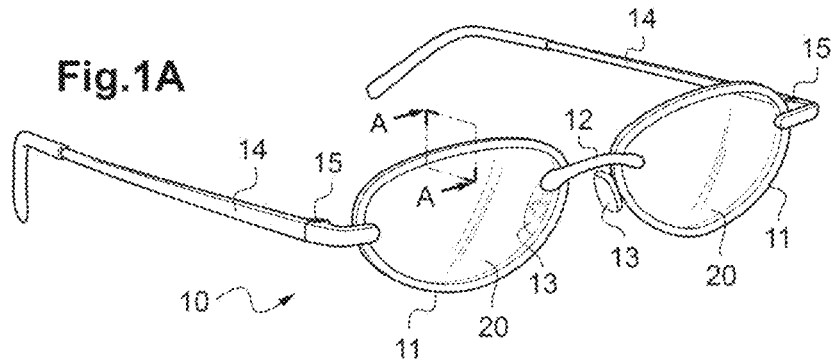
Fig.1A
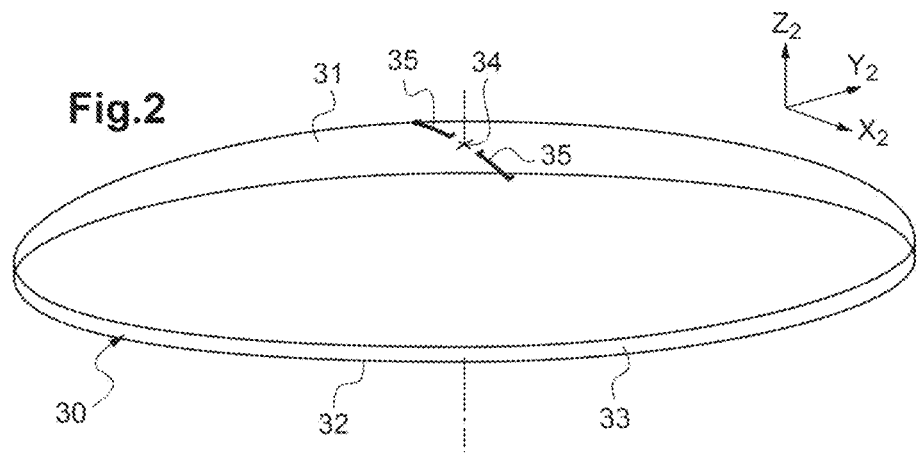
Fig.2
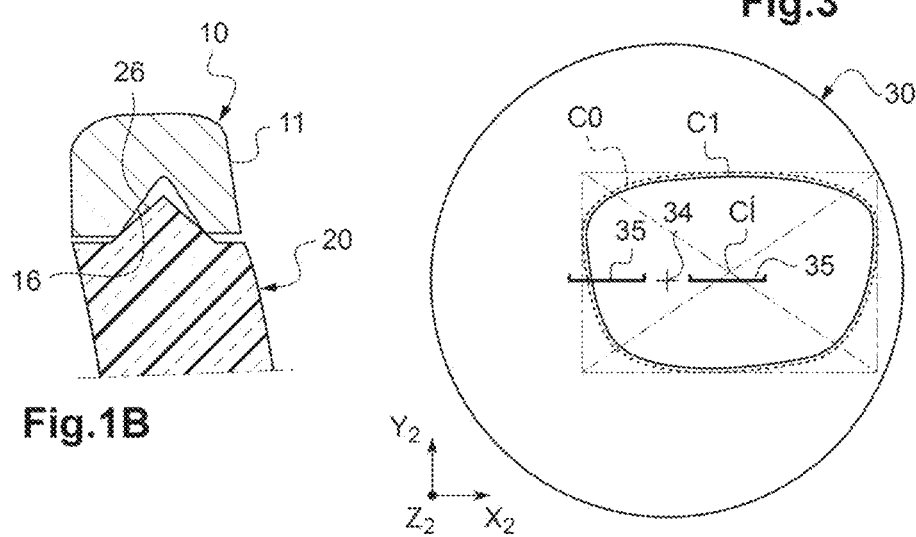
Fig.1B
Fig.3

METHOD FOR BEVELLING AN OPHTHALMIC LENS

TECHNICAL FIELD TO WHICH THE INVENTION RELATES

The present invention generally relates to the field of eyeglasses.

It more particularly relates to a method for working out a setting for beveling an ophthalmic lens, with a view to its insertion in an eyewire of a spectacle frame.

The invention may be implemented in a software package for controlling a device for centering ophthalmic lenses, and this is one particularly advantageous application thereof.

TECHNOLOGICAL BACKGROUND

When a customer wants to acquire a pair of corrective spectacles at an opticians, he starts by choosing a spectacle frame in which dummy demonstration lenses are mounted.

The optician then needs to trim ophthalmic lenses to replace these demonstration lenses.

For each ophthalmic lens, the optician carries out four main operations, which are:
  acquiring the outline of one of the eyewires of the selected spectacle frame;
  centering the lens, which consists in determining the optical frame of reference of this lens then in transferring to this ophthalmic lens the outline acquired beforehand, in such a way that, once trimmed to this outline and mounted in the spectacle frame, the lens is suitably centered facing the pupil of the corresponding eye of the customer;
  blocking the ophthalmic lens, which consists in fastening a blocking accessory to the front face of the lens in a determined position, in order to allow the lens to be handled without misplacing the frame of reference of this lens (this being necessary when the lens must be passed from one machining station to another); then
  machining the lens, which consists in cutting it to the desired outline.

In the context of the present invention, spectacle frames with eyewires, i.e. rimmed spectacle frames, are more particularly of interest.

The machining operation then comprises a roughing step in which the initial contour of the lens is brought closer to the desired outline, then a beveling step that allows a fitting rib (commonly called a bevel) to be formed on the edge face of the lens, which fitting rib is able to fit into a fitting groove (commonly called a bezel) that runs along the inner face of the corresponding eyewire of the frame.

The acquiring and machining operations must be carried out with care if the lens is to fit perfectly into its eyewire, without effort and "the first time round", i.e. without additional machining (rework).

To acquire the shape of the eyewire, an outline-reading apparatus including a surface profilometer that is slid along the bezel of the eyewire directly is generally used.

This reading apparatus then allows the shape of the bottom of the bezel to be registered in order to allow the lens to be machined in such a way that the top of its bevel has a homologous shape to that of the bezel.

The major drawback of this solution is that it requires an outline reader to be used, the purchase and maintenance costs of which are high.

It is moreover time-consuming to implement and requires great care to be taken by the optician, this running contrary to the sought-after principle of simplicity.

SUBJECT OF THE INVENTION

In order to remedy this drawback, the present invention proposes a solution allowing the shape of the eyewire to be obtained less expensively.

More particularly, according to the invention a method is provided including steps consisting in:
  a) acquiring a correctional parameter relating to the play between the eyewire and the demonstration lens;
  b) capturing a front-on image of the demonstration lens extracted beforehand from the eyewire;
  c) determining, in said front-on image, an initial outline of said demonstration lens;
  d) calculating a corrected outline, by correcting the initial outline depending on said correctional parameter; and
  e) deducing said beveling setting depending on said corrected outline.

The invention therefore proposes to base the determination of the setting for beveling the ophthalmic lens on the shape of the corresponding demonstration lens delivered with the spectacle frame, and no longer on the shape of the frame.

This solution therefore makes it possible to do without an outline-reading apparatus. It is therefore inexpensive.

However, this solution nonetheless allows satisfactory results (avoiding any rework) to be obtained provided that it is carried out while taking into account the correctional parameter.

Specifically, the Applicant has observed that demonstration lenses are generally crudely machined, to the point that their insertion in spectacle frames generally causes play to appear between the lens and its eyewire. It will therefore be understood that simply reproducing the shape of the demonstration lens would not allow the ophthalmic lens to be satisfactorily mounted in its spectacle-frame eyewire.

This is the reason why the invention therefore proposes to take into account the correctional parameter.

This parameter will preferably be obtained by the user (in general the optician) who, before removing the demonstration lens, will verify whether the latter is inserted tightly, or with play in the eyewire of the spectacle frame. The correctional parameter will then allow any registered play to be compensated for in order to achieve a more precise fit of the ophthalmic lens in the spectacle frame.

Preferably, the photo of the demonstration lens will be acquired using the device for centering the lens, thereby avoiding the need for recourse to any device dedicated to this image acquisition.

This solution thus proves to be inexpensive, rapid and simple to implement.

Since this solution requires no technical modification of the centering device but only a software modification, it will furthermore possibly be implemented in the control software packages of existing centering devices.

The following are other advantageous and nonlimiting features of the method according to the invention:
  said spectacle frame including a second eyewire in which a second demonstration lens is initially mounted, in step a), a second correctional parameter relating to the play between the second eyewire and the second demonstration lens is acquired, and, in step d), a second corrected outline is calculated by operating a symmetry of and correcting said initial outline depending on said second correctional parameter;

in step a), the correctional parameter is selected from a list comprising between three and five values;

in step d), the corrected outline is calculated depending on another correctional parameter relating to the material of the ophthalmic lens;

in step d), the corrected outline is calculated depending on another correctional parameter relating to the material of the spectacle frames;

in step d), the corrected outline is calculated depending on another correctional parameter relating to the hot or cold insertion mode expected to be used to insert the ophthalmic lens in the eyewire of the spectacle frame;

in step d), the corrected outline is calculated depending on another correctional parameter relating to the optical power of the ophthalmic lens;

in step d), the corrected outline is calculated depending on another correctional parameter relating to the thickness of the ophthalmic lens;

in step d), the corrected outline is calculated depending on another correctional parameter relating to whether the user wants the ophthalmic lens to fit in the eyewire of the spectacle frame with or without play;

in step b), said front-on image of the demonstration lens is acquired by means of a centering device that includes a holder for the demonstration lens; on one side of this holder, a reflective plate; and, on the other side of this holder, illuminating means and image-capturing means.

The invention also relates to a method for preparing an ophthalmic lens with a view to its insertion in an eyewire of a spectacle frame in which a beveled demonstration lens is initially mounted, comprising:

a step of working out a setting for beveling the ophthalmic lens using a method such as above, in which the corrected outline is calculated depending on at least one coefficient deduced from said correctional parameter;

a step of beveling the ophthalmic lens according to the beveling setting, then, if the ophthalmic lens is not suitable for insertion in the eyewire;

a step of reworking the bevel of the ophthalmic lens in such a way that the lens is made suitable for insertion in the eyewire;

a step of capturing a front-on image of the reworked ophthalmic lens;

a step of determining, in said front-on image, a reworked outline of said reworked ophthalmic lens; and a step of correcting said coefficient depending on the difference between the reworked outline and the corrected outline.

DETAILED DESCRIPTION OF ONE EXEMPLARY EMBODIMENT

The description which follows with reference to the appended drawings, which are given by way of nonlimiting example, will make it easy to understand the essence of the invention and how it can be achieved.

In the appended drawings:

FIG. 1A is a schematic perspective view of a rimmed spectacle frame including two eyewires in each of which is mounted a demonstration lens;

FIG. 1B is a schematic cross-sectional view in the plane A-A of FIG. 1A;

FIG. 2 is a schematic perspective view of an unedged ophthalmic lens;

FIG. 3 is a front-on view of the unedged ophthalmic lens in FIG. 2, in which the initial outline of one of the demonstration lenses of FIG. 1 and an outline corrected using a method according to the invention have been shown;

FIG. 1A shows a rimmed spectacle frame 10.

Figure 4:
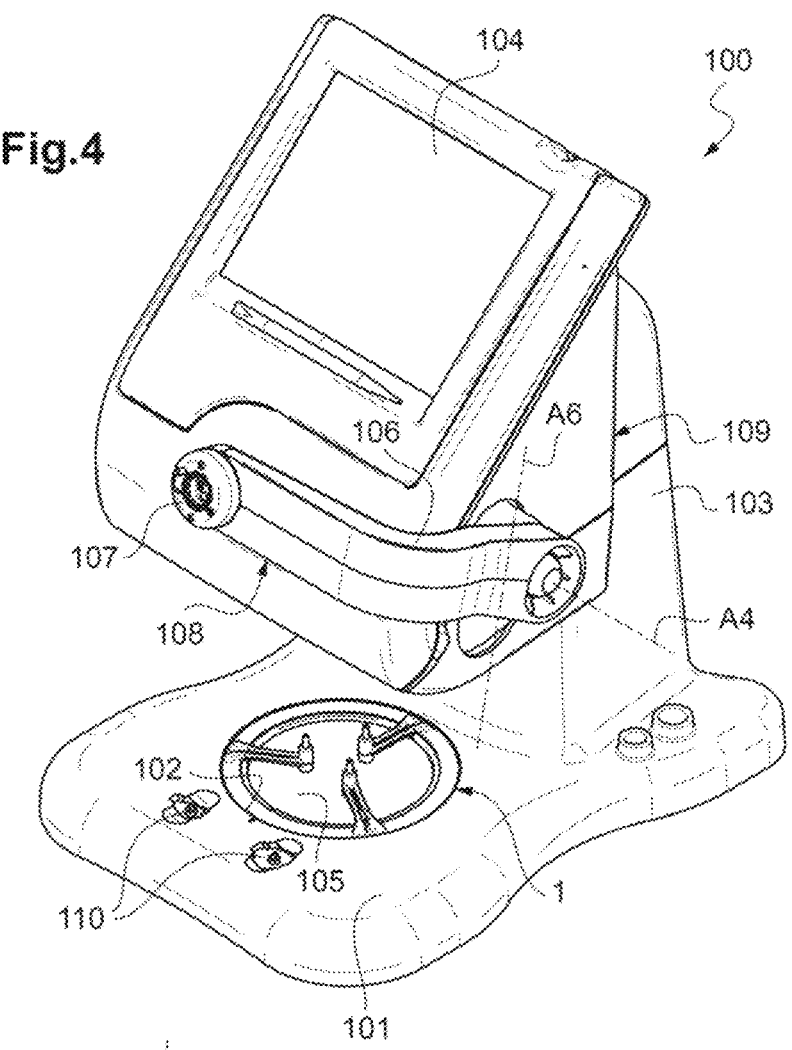
FIG. 4 is a schematic perspective view of a centering-blocking apparatus suitable for implementing the method according to the invention.

This spectacle frame 10 includes two eyewires 11 (commonly called "rims") each accommodating one demonstration lens 20.

Such a demonstration lens 20 generally takes the form of a dummy eyeglass, which is delivered to the optician with the spectacle frame 10. Thus equipped with two demonstration lenses 20, the appearance of the spectacle frame 10 is very similar to that which it will have when it is equipped with corrective ophthalmic lenses, thereby making it easier for the customer to choose a spectacle frame.

The two rims 11 are connected to each other by a bridge 12. Furthermore, they are each equipped with a nose pad 13 able to rest on the nose of the wearer, and with a temple 14 able to rest on one of the ears of the wearer. Each temple 14 is hinged to the corresponding rim by means of a hinge 15.

As the cross-sectional view in FIG. 1B shows, the rims 11 of the spectacle frame 10 each have an interior face in which a fitting groove (commonly referred to as a "bezel 16") of generally dihedral-shaped cross section is produced.

In order to fit in these two rims 11, the demonstration lenses 20 each have a field along which a fitting rib (commonly called a "bevel 26") of generally dihedral-shaped cross section is produced.

FIG. 2 shows an unedged ophthalmic lens 30 that is intended to be machined then inserted in one of the rims 11 of the spectacle frame 10, in place of one of the demonstration lenses 20.

As FIG. 3 shows, the ophthalmic lens 30 has a front optical face 31, a back optical face 32 and an edge face 33.

Here, the front optical face 31 is spherical and has a known radius of curvature.

The edge face 33 of the lens has a circular initial outline. However, the ophthalmic lens 30 is intended to be edged to the shape of the corresponding rim 11 of the spectacle frame 10 so as to be able to be fitted in said rim.

The ophthalmic lens 30 is more precisely intended to be edged so as to present, on its edge face 33, a fitting rib (or bevel) able to fit into the bezel 16 of the corresponding rim 11 of the spectacle frame 10.

This ophthalmic lens 30 has optical properties tailored to the needs of the spectacle wearer. It in particular has prismatic, cylindrical and spherical refringence properties that are specific to the wearer.

This ophthalmic lens 30 is furthermore provided with marks 34, 35 that make it easy to locate the optical frame of reference of the ophthalmic lens 30 for its insertion in the spectacle frame 10 selected by the wearer. Here, these marks consist of temporary ink marks 34, 35.

Here, to simplify the description, the case of a lens having an exclusively spherical optical power will be considered.

These marks then comprise a centering cross 34 allowing the position of the center point of the lens, i.e. the point where an incident ray and the transmitted ray have the same axis, to be located. Furthermore, they comprise, on either side of this centering cross 34, two horizon lines 35 indicating the horizontal of the ophthalmic lens 30.

The optical frame of reference of the ophthalmic lens 30 is then characterized by an orthonormal coordinate system comprising a horizontal axis X2 parallel to said horizon lines 35, a y-axis Y2, and a normal axis Z2 that is perpendicular to the plane tangent to the front face of the ophthalmic lens 30 at the center point 34.

FIG. 4 shows a centering-blocking apparatus 100.

Such an apparatus is generally employed to carry out operations of centering and blocking the ophthalmic lens 30 to be inserted in the spectacle frame 10.

The objective of the centering operation is to locate the frame of reference of the ophthalmic lens 30, and to determine the position that the outline to which the lens must be cut must occupy if the lens, once edged along this outline then inserted in the spectacle frame, is to be suitably centered opposite the corresponding eye of the individual.

The objective of the blocking operation is to place a blocking accessory on the ophthalmic lens, thereby, on the one hand, making it easier to pick up the lens in order to transport it from the centering-blocking apparatus 100 to a grinder, and, on the other hand, providing a stable position indicator allowing the position of the frame of reference of the lens to be located after it has been transported.

For this purpose, the centering-blocking apparatus 100 comprises:
  a chassis 103,
  a workstation 101 fastened to the chassis 103 and that rests on a horizontal plane (for example on a table);
  a touch display screen 104 fastened to the chassis 103 and oriented so that it may be seen by the optician working at the workstation 101,
  means 109 for centering the lens, said means 109 being fastened to the chassis 103; and
  blocking means 108 that are movably mounted on the chassis 103.

The workstation 101 includes a horizontal work plane that opens onto a zone 102 for loading an ophthalmic lens.

This loading zone 102 in the present case includes a transparent and flat bearing platen 105 that fills a circular aperture in the horizontal work plane, and an ophthalmic-lens holder 1. This holder 1 here takes the form of a tripod placed on the bearing platen 105.

As for the blocking means 108, they comprise a maneuvering arm 106 equipped with a gripper 107 suitable for picking up a blocking accessory placed beforehand on a receptacle 110 and for placing said accessory in a determined location on the front face of an ophthalmic lens.

Such as shown in FIG. 4, the maneuvering arm 106 is motorized. It is then able to move translationally along an axis A6 in order to rise or drop toward the loading zone 102 and rotationally about an axis A4 orthogonal to the axis A6 in order to move away from or toward the loading zone 102.

The means 109 for centering the ophthalmic lens are for their part designed to determine the position of the frame of reference of the ophthalmic lens 30 placed on the tripod 1 by identifying the position and the orientation of various centering marks 34, 35 painted on or engraved on the front face 31 of the ophthalmic lens 30.

Figure 5:
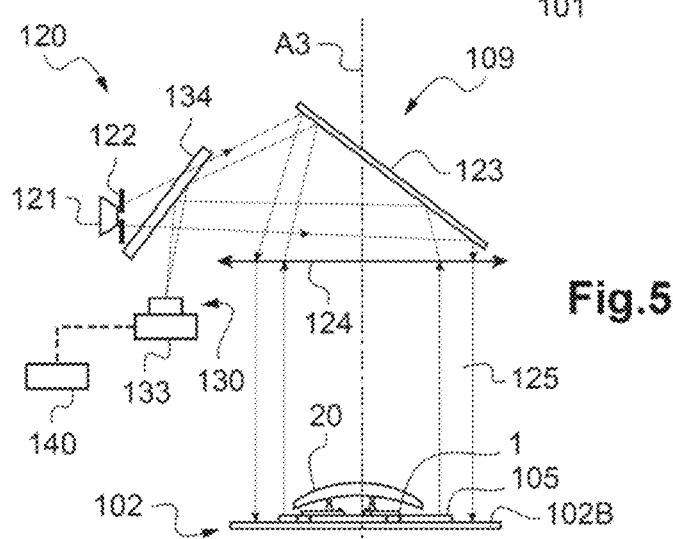
FIG. 5 is a schematic view of the centering means of the centering-blocking apparatus in FIG. 4.

As FIG. 5 shows, these centering means 109 include means 120 for illuminating the ophthalmic lens 30, means 130 for acquiring an image of the ophthalmic lens 30 illuminated by the illuminating means 120, and processing means 140 for analyzing the acquired image.

In the preferred embodiment of the invention, the illuminating means 120 and the acquiring means 130 are located on the same side of the loading zone 102.

A reflector 102B is then installed on the other side of the loading zone 102, under the bearing platen 105, in order to reflect the light. Here, this reflector 102B is formed by a fixed mirror.

The illuminating means 120 here comprise an extended light source 121 that is converted to a point light source using a perforated plate 122, which emits a divergent light beam. They also comprise a mirror 123 inclined at 45°, which reflects this divergent light beam and which allows the bulk of the assembly to be decreased, and a convergent lens 124 suitable for forming a light flux 125 containing parallel rays in the direction of the tripod 1.

The acquiring means 130 for their part comprise, in addition to the mirror 123, a half-silvered mirror 134 inclined at 45° and a digital video camera 133 for acquiring at least one image. The half-silvered mirror 134, placed in front of the light source, allows some of the light to be transmitted toward the lens and allows the image of the lens to be partially reflected toward the digital video camera 133. Thus, the video camera 130 is suitable for acquiring an image of the ophthalmic lens 30 placed on the tripod 1, in which image the outline of the ophthalmic lens 30 and the centering marks 34, 35 in particular appear.

In the same way, the video camera 130 is perfectly suitable for acquiring an image of one of the demonstration lenses 20 placed for this purpose on the tripod 1, in which image the initial outline C0 of this demonstration lens 20 will in particular appear.

The image-processing means form an integral portion of the electronic control system 140 of the centering-blocking device 100.

This electronic control system, also called a "computer 140" below, comprises a processor (CPU), a random access memory (RAM), a read-only memory (ROM), analog-to-digital (A/D) converters and various input and output interfaces.

By virtue of its input interfaces, the computer 140 is suitable for receiving input signals, especially from the video camera 133 and from the touch display screen 104.

By virtue of a software package stored in its read-only memory, the computer 140 is suitable for processing the images acquired by the video camera 133 and information input on the display screen 104 in order to deduce therefrom a setting CONS for beveling the ophthalmic lens 30.

Lastly, by virtue of its output interfaces, the computer 140 is suitable for transmitting this beveling setting CONS to the grinder.

To insert two ophthalmic lenses 30 in the two rims 11 of the spectacle frame 10, the optician then carries out three main operations, which are:
  acquiring the outlines to which to edge the ophthalmic lenses 30;
  centering and blocking of the lenses by means of the centering-blocking device 100; then
  machining of the lenses 100, which consists in cutting them to the desired outlines, considering defined centering parameters, using a grinder.

Since the centering, blocking and machining operations are well known to those skilled in the art, they will not be described here.

Rather, the invention relates to a new method for acquiring the outlines to which the ophthalmic lenses 30 are to be edged.

It more exactly relates to a method for working out the beveling settings CONS to be transmitted to the grinder in order to allow the latter to cut the ophthalmic lenses 30 to outlines suitable for the shapes of the rims 11 of the spectacle frame 10.

According to one particularly advantageous feature of the invention, this method includes:
- a first step of acquiring a correctional parameter P1 relating to the play between the eyewire 11 and the demonstration lens 20 in question;
- a second step of capturing a front-on image of the demonstration lens 20 extracted beforehand from the eyewire 11;
- a third step of determining, in said front-on image, an initial outline C0 of said demonstration lens 20;
- a fourth step of calculating a corrected outline C1, by correcting the initial outline C0 depending at least on said correctional parameter P1; and
- a fifth step of deducing said beveling setting CONS depending on said corrected outline C1.

As will be described in the rest of the description, in the fourth step the corrected outline C1 will possibly optionally be calculated depending on other correctional parameters chosen from the following list:
- a correctional parameter P2 relating to the material of the ophthalmic lens 30;
- a correctional parameter P3 relating to the material of the spectacle frame;
- a correctional parameter P4 relating to the hot or cold insertion mode expected to be used to insert the ophthalmic lens 30 in the eyewire 11 of the spectacle frame 10;
- a correctional parameter P5 relating to the optical power of the ophthalmic lens 30;
- a correctional parameter P6 relating to the thickness of the ophthalmic lens 30; and
- a correctional parameter P7 relating to whether the user wants the ophthalmic lens 30 to fit in the eyewire 11 of the spectacle frame 10 with or without play (specifically, certain opticians prefer there to be a slight play between the lens and its rim in order to facilitate its fitting).

In practice, the optician proceeds in the following way.

In the first step; the optician turns on the centering-blocking apparatus 100, this causing its computer 140 to start up.

The computer 140 then commands a menu inviting the optician to input a correctional parameter P1 for each of the two demonstration lenses 20 to be displayed on the display screen 104.

Here, this menu is divided into two portions corresponding to the two, left and right, demonstration lenses 20, respectively.

Each of these portions invites the optician to select one of three buttons on which appear the messages "no play", "little play", "substantial play".

To determine which of the buttons to select, the optician then handles the pair of spectacles 10 equipped with its demonstration lenses 20 so as to verify the quality of the assembly of each of the demonstration lenses 20 in the rims 11.

He may thus easily observe, for each demonstration lens 20:
- if it is mounted in its rim 11 with a substantial amount of play (the lens being trimmed too small, it indeed moves in the rim 11);
- if it is mounted in its the rim 11 with a small amount of play (the lens being trimmed too large, it easily falls out of its rim 11);
- if it is mounted in its rim 11 without play (the lens is correctly held in the rim 11).

Then, for each demonstration lens 20, the optician selects on the display screen 104 the button corresponding to the observed play.

It is in this way that the computer 140 acquires the correctional parameters P1 assigned to the two demonstration lenses 20.

Once this first menu has been validated, the computer 140 then commands a second menu inviting the optician to input the correctional parameters P2 relating to the materials of the ophthalmic lenses 30 to be displayed on the display screen 104.

Here again, this menu is divided into two portions corresponding to the two, left and right, ophthalmic lenses 30, respectively.

Each of these portions invites the optician to select one of six buttons on which appear the messages:
- "organic" (index equal to 1.5);
- "medium-index organic" (index equal to 1.6);
- "high-index organic" (index equal to 1.75);
- "Trivex®" (index equal to 1.53);
- "mineral" (index equal to 1.5); and
- "polycarbonate" (index equal to 1.59).

Then, for each ophthalmic lens 30, the optician selects on the display screen 104 the button corresponding to the material of the ophthalmic lens 30.

Once this second menu has been validated, the computer 140 commands a third menu inviting the optician to input the correctional parameters P3 (relating to the material of the spectacle frame 10) and P4 (relating to the hot or cold insertion mode expected to be used to insert the ophthalmic lenses 30 in their rims 11) to be displayed on the display screen 104.

This menu invites the optician to select one of two buttons on which the messages "plastic frame" and "metal frame" appear, then one of two buttons on which the messages "cold insertion" and "hot insertion" appear.

The optician then selects the buttons corresponding to the material of the spectacle frame 10 selected by the customer and to the insertion mode that he will use to fit the ophthalmic lenses 30 in the spectacle frame 10.

Once this third menu has been validated, the computer 140 commands a fourth menu inviting the optician to input the correctional parameters P5 relating to the spherical and/or cylindrical and/or prismatic refringence of the two ophthalmic lenses 30 to be displayed on the display screen 104.

Here, this menu is divided into two portions corresponding to the two, left and right, ophthalmic lenses 30, respectively.

Each of these portions invites the optician to input numerical values corresponding to the spherical powers of the ophthalmic lenses 30.

Lastly, once this fourth menu has been validated, the computer 140 commands a fifth and last menu inviting the optician to input the correctional parameter P7 relating to whether the user wants the ophthalmic lenses 30 to fit in the spectacle frame 10 with or without play to be displayed on the display screen 104.

This menu invites the optician to select one of two buttons on which the messages "fit without play" and "fit with slight play" appear.

The optician then selects the button corresponding to his desire.

The input of this correctional parameter P7 will be necessary initially, following acquisition of the centering-blocking device 100.

Provision will possibly be made, if the computer 140 observes that the correctional parameter P7 chosen by the optician is always the same, for it to no longer display this fifth menu, and for this parameter to be considered not to change.

In a second step, the optician extracts a demonstration lens 20 out of the spectacle frame 10, so as to make it possible to acquire the shape of its initial outline C0.

In practice, the optician chooses the demonstration lens 20 that is mounted in its rim 11 with the least play. Specifically, it is its initial outline C0 that is the best working base from which to determine the corrected outline C1 to which to edge the ophthalmic lenses 30.

The optician then places this demonstration lens 20 in the centering-blocking device 100 so that its concave back face rests on the tripod 1 of this centering-blocking device 100.

In this position, as FIG. 5 shows, the central axis A3 of the demonstration lens 20 (i.e. the axis that passes through the center point of the front face of the demonstration lens 20 and that is orthogonal to the plane tangent to the front face of the demonstration lens 20 at this center point) is substantially parallel to the light rays that arrive at the lens.

The video camera 133 may thus acquire a front-on image of the demonstration lens 20, i.e. an image in a plane orthogonal to the central axis A3.

In a third step, by virtue of this image, the computer 140 may determine and store in memory the two-dimensional geometry of the initial outline C0 of this demonstration lens 20.

This determining step requires no particular modification of the control software package of the centering-blocking device 100, since such a centering-blocking device is designed to be able to locate the outline of an ophthalmic lens to be centered.

In the present case, the registered initial outline C0 corresponds to the curve described by the top of the bevel 26 of the demonstration lens 20.

This initial outline C0 will possibly be stored in memory in the form of a mathematical function.

Here it will be considered to be stored in memory in the form of a set of n doublets corresponding to the two-dimensional coordinates of n points characterizing the shape of the initial outline C0.

A set of 360 points will be used here.

In a fourth step, the computer 140 will correct the shape of this initial outline C0 so as to ensure the ophthalmic lenses 30 fit in their rims 11 "first time round" (i.e. so rework is not required).

The corrected outline C1 that will be calculated first will be that of the ophthalmic lens 30 to be engaged in the rim 11 from which the demonstration lens 20 (the lens the image of which was acquired) was extracted.

In practice, the calculation of the corrected outline C1 will here consist in applying a homothetic transform to the initial outline C0, of ratio k and of center A1.

The center A1 of this homothetic transform will possibly be any point comprised in the interior of the initial outline C0.

Here, as FIG. 3 shows, it is a question of the "boxing center Ci" of the initial outline C0, i.e. the center of the rectangle that circumscribes the initial outline C0 and two of the sides of which are parallel to the horizon lines 35.

The ratio k of this homothetic transform will for its part be determined depending on the correctional parameters P1, P2, P3, P4, P5 and P7.

It will thus possibly for example be determined in the following way.

The first case i) to be considered is that in which the parameter P1 input by the optician indicates that the first demonstration lens 20 was mounted in its rim 11 without play.

In this case i), the computer 140 assigns to the ratio k the value 1, whatever the values of the other correctional parameters P2, P3, P4, P5 and P7.

Thus it will be understood that the corrected outline C1 will in this case be identical to the initial outline C0.

The second case ii) to be considered is that in which the parameter P1 input by the optician indicates that the first demonstration lens 20 was mounted in its rim 11 with play.

Then, if the parameter P1 indicates that the first demonstration lens 20 was mounted in its rim 11 with lithe play, the computer 140 assigns to the ratio $k_0$ the value 1.015.

Otherwise, if the parameter P1 indicates that the first demonstration lens 20 was mounted in its rim 11 with substantial play, the computer 140 assigns to the ratio $k_0$ the value 1.025.

In this second case ii), the ratio $k_0$ is then refined depending on the other correctional parameters P2, P3, P4, P5 and P7.

Thus, if the correctional parameter P2 (relating to the material of the ophthalmic lens 30) indicates that the index of the ophthalmic lens 30 is comprised between 1.5 and 1.6 (this meaning that the lens may be considered to be flexible), the ratio $k_0$ may be slightly increased. Specifically, the flexibility of the ophthalmic lens 30 will permit the fit of the ophthalmic lens 30 in its rim 11 to be a little tighter.

In practice, the new ratio $k_1$ will possibly be calculated using the following formula:

$k_1=k_0+a$, a being a constant read from the read-only memory of the computer, the value of which depends on the material of the ophthalmic lens 30, and which is obtained empirically. The higher the index n, the lower this constant will be.

If the correctional parameter P3 (relating to the material of the spectacle frame 10) indicates that the spectacle frame 10 may be considered to be flexible (because made of plastic), the ratio $k_1$ may be slightly increased. Specifically, the flexibility of the frame will allow the fit of the ophthalmic lens 30 in its rim 11 to be a little tighter.

In practice, the new ratio $k_2$ will be calculated using the following formula:

$k_2=k_1$ if the spectacle frame 10 is made of metal; and $k_2=k_1+b$ if the spectacle frame 10 is made of plastic, b being a strictly positive constant obtained empirically.

If the correctional parameter P4 (relating to the hot or cold insertion mode used to insert the ophthalmic lens 30 in the rim 11) indicates that the ophthalmic lens 30 will be inserted hot into its rim 11, the ratio $k_2$ may be slightly increased. Specifically, this insertion method allows the fit of the ophthalmic lens 30 in its rim 11 to be a little tighter.

In practice, the new ratio $k_3$ will be calculated using the following formula:

$k_3=k_2$ if the insertion method chosen is "cold insertion"; and $k_3=k_2+c$ if the insertion method chosen is "hot insertion", c being a strictly positive constant obtained empirically.

If the correctional parameter P5 (relating to the refringence properties of the ophthalmic lens 30) indicates that the ophthalmic lens 30 will have, once it has been edged, an edge of small thickness, the ratio $k_3$ may be slightly increased. Specifically, this small thickness at the edge of the ophthalmic lens 30 increases its flexibility, this making it possible to make the fit of the ophthalmic lens 30 in its rim 11 a little tighter.

In practice, the new ratio k will be calculated using the following formula:

$k=k_3$ if the lens has a positive spherical power; and $k=k_3+d$ if the lens has a negative spherical power, d being a strictly positive constant obtained empirically.

In the two envisioned cases and ii), a homothetic ratio k is thus obtained.

This ratio k may be corrected one last time to take into account whether the user wants the ophthalmic lens 30 to fit in the rim 11 of the spectacle frame 10 with or without play. Thus, to this ratio k, a strictly positive constant e (obtained empirically) will possibly be added if the correctional parameter P7 indicates that the optician desires the lens to fit with a slight play.

Once this ratio k has been set, the computer 140 calculates the coordinates of the 360 points of the corrected outline C1.

In a last step, the computer 140 works out the beveling setting CONS from this corrected outline C1.

To do this, the computer 140 determines the spatial coordinates of 360 points issued from the projection of the 360 points of the corrected outline C1 onto a predetermined reference surface.

This predetermined reference surface is here representative of the shape of the front face of the ophthalmic lens 30. It is therefore spherical and has a radius of curvature that the optician will have entered beforehand on the display screen 104.

The projection is here an orthogonal projection along the axis Z2.

These 360 points thus define a three-dimensional outline, which corresponds to the shape that the top of the bevel to be formed on the edge face of the ophthalmic lens 30 must have.

Thus, this three-dimensional outline is the setting CONS for beveling the first ophthalmic lens 30.

The computer 140 then proceeds to calculate the beveling setpoint CONS' of the second ophthalmic lens 30.

For the sake of simplicity and rapidity, this calculation will be carried out on the basis, not of an image of the second demonstration lens 20, but rather on the basis of a symmetry of the initial outline C0.

The correctional parameters will then be used to correct this symmetry of the initial outline C0, in order to end up with a corrected outline CV.

It will be noted that in general, since the correctional parameters assigned to the two lenses are different, the two corrected outlines C1, C1' will not be symmetric.

The present invention is in no way limited to the embodiment described and shown, and a person skilled in the art will be able to apply any variant thereto in accordance with the spirit thereof.

The homothetic ratio k will possibly in particular be refined depending on other parameters.

Thus it will possibly for example be corrected depending on whether the initial outline is considered rather round or square. Specifically, if the initial outline is rather square, it is known that the bevel of the ophthalmic lens will run the risk of being pared back during machining, this in the end decreasing the perimeter of the ophthalmic lens. In this case, provision will possibly be made, in expectation of this decrease in perimeter, to decrease the homothetic ratio k by a nonzero constant obtained empirically.

According to another variant, the final outline will possibly be obtained by deforming the initial outline non-homothetically. Thus, the final outline will possibly be obtained by deforming the initial outline only widthwise (along X2), its height (along Y2) remaining the same.

According to another variant, the parameter used to estimate the thickness at the edge of the ophthalmic lens will possibly be not the spherical power of the lens but rather a datum input by the optician depending on whether he judges the lens to have a thick edge face or not.

According to another variant of the invention, to acquire the correctional parameter (relating to the play between the rim and the demonstration lens), provision could have been made for the computer to offer the optician a greater number of choices, for example by displaying five buttons on which the messages "fit too tight", "no play", "slight play", "middling play" and "substantial play" appear. In the case where the button "fit too tight" is selected, provision will then possibly be made to assign to the ratio $k_0$ the value 0.09.

According to another embodiment of the invention, provision will possibly be made for the values assigned to the ratios $k_0$ and to the coefficients a, b, c and d not to be predetermined, these values instead possibly changing as the centering-blocking device 100 learns.

In this other embodiment, provision will possibly be made for, on delivery, the values assigned to the ratios $k_0$ and to the coefficients a, b, c and d to be slightly higher than those used in the first embodiment described above.

As a result, it will generally be impossible to insert the beveled ophthalmic lenses 30 into their spectacle frames 10 in the first cycles of use of the centering-blocking device 100.

The optician will then be forced to rework the beveling of each ophthalmic lens 30 so as to allow it to be inserted into the spectacle frame 10. In this reworking operation, the optician will possibly especially edge the ophthalmic lens 30 in such a way that it is fittable in its rim 11 with or without play, depending on his preference.

In this embodiment, the centering-blocking device 100 will take advantage of this reworking operation to optimally adjust the values assigned to the ratios $k_0$ and to the coefficients a, b, c and d.

Before the re-edged ophthalmic lens 30 is inserted in the spectacle frame 10, the optician will thus place this ophthalmic lens 30 on the tripod 1 of the centering-blocking device 100, so that the computer 140 can acquire the reworked outline C2 of the ophthalmic lens 30.

The computer 140 will then possibly compare this reworked outline C2 with the corrected outline C1.

It will possibly in particular calculate the ratio $k_r$ that would have needed to be assigned to the initial outline C0 to obtain a final outline allowing the ophthalmic lens 30 to be inserted in its rim 11 of the spectacle frame 10 the first time round.

The computer 140 will then, on each cycle, store in memory the difference $\Delta k$ between the ratio k that it initially assigned and the ratio kr.

The computer 140 will thus possibly correct its method for calculating the ratio k, so as to be able, eventually, to obtain edged lenses that are insertable in their frames the first time round and that furthermore satisfy the optician from the point of view of his preference for a fit with or without play.

More precisely, the computer 140 will possibly correct the ratio k before it is sent to the grinder, depending on the differences $\Delta k$ stored in memory in preceding cycles.

Otherwise it will possibly modify each of the values assigned to the ratios $k_0$ and to the coefficients a, b, c and d depending on the differences $\Delta k$ stored in memory. This second method will be more precise and will allow better results to be obtained in the long term. However, it requires a longer period of learning and therefore a greater number of reworking operations in the short term.

The invention claimed is:

1. A method for working out a setting for beveling an ophthalmic lens, with a view to its insertion in an eyewire of a spectacle frame in which a beveled demonstration lens is initially mounted, the method comprising the steps of:
   a) acquiring a correctional parameter relating to the play between the eyewire and the demonstration lens;
   b) capturing a front-on image of the demonstration lens extracted beforehand from the eyewire;
   c) determining, in said front-on image, an initial outline of said demonstration lens;
   d) calculating a corrected outline, by correcting the initial outline depending on said correctional parameter; and
   e) deducing said setting for beveling an ophthalmic lens depending on said corrected outline.

2. The method as claimed in claim 1, wherein, said spectacle frame including a second eyewire in which a second demonstration lens is initially mounted:
   in step a), a second correctional parameter relating to the play between the second eyewire and the second demonstration lens is acquired; and
   in step d), a second corrected outline is calculated by operating a symmetry of and correcting said initial outline depending on said second correctional parameter.

3. The method as claimed in claim 1, wherein, in step a), the correctional parameter is selected from a list comprising between three and five values.

4. The method as claimed in claim 1, wherein, in step d), the corrected outline is calculated depending on another correctional parameter relating to the material of the ophthalmic lens.

5. The method as claimed in claim 1, wherein, in step d), the corrected outline is calculated depending on another correctional parameter relating to the material of the spectacle frame.

6. The method as claimed in claim 1, wherein, in step d), the corrected outline is calculated depending on another correctional parameter relating to the hot or cold insertion mode expected to be used to insert the ophthalmic lens in the eyewire of the spectacle frame.

7. The method as claimed in claim 1, wherein, in step d), the corrected outline is calculated depending on another correctional parameter relating to the optical power of the ophthalmic lens.

8. The method as claimed in claim 1, wherein, in step d), the corrected outline is calculated depending on another correctional parameter relating to the thickness of the ophthalmic lens.

9. The method as claimed in claim 1, wherein, in step d), the corrected outline is calculated depending on another correctional parameter relating to whether the user wants the ophthalmic lens to fit in the eyewire of the spectacle frame with or without play.

10. The method as claimed in claim 1, wherein, in step b), said front-on image of the demonstration lens is acquired by means of a centering device that includes:
    a holder for the demonstration lens;
    on one side of this holder, a reflective plate; and
    on the other side of this holder, illuminating means and image-capturing means.

11. The method of claim 1, further comprising acquisition of the play between the eyewire and the demonstration lens.

12. The method of claim 1, further comprising measuring the play between the eyewire and the demonstration lens.

13. The method as claimed in claim 12, comprising the further step of:
    f) beveling the ophthalmic lens according to the setting for beveling deduced in step e).

14. The method as claimed in claim 13, wherein, in step f), the beveling the ophthalmic lens according to the setting for beveling deduced in step e) produces a desired amount of play between the eyewire and the ophthalmic lens.

15. The method of claim 13, further comprising acquisition of the play between the eyewire and the demonstration lens.

16. The method of claim 13, further comprising measuring the play between the eyewire and the demonstration lens.

17. A method for preparing an ophthalmic lens with a view to insertion of the ophthalmic lens in an eyewire of a spectacle frame in which a beveled demonstration lens is initially mounted, the method comprising the steps of:
    working out a setting for beveling the ophthalmic lens for insertion in the eyewire of the spectacle frame in which a beveled demonstration lens is initially mounted, including:
    a) acquiring a correctional parameter relating to a play between the eyewire and the demonstration lens;
    b) capturing a front-on image of the demonstration lens extracted beforehand from the eyewire;
    c) determining, in said front-on image, an initial outline of said demonstration lens;
    d) calculating a corrected outline, by correcting the initial outline depending on said correctional parameter; and
    e) deducing said setting for beveling an ophthalmic lens depending on said corrected outline; and
    beveling the ophthalmic lens according to the setting for beveling deduced in step e), then, when the ophthalmic lens is not suitable for insertion in the eyewire:
    reworking the bevel of the ophthalmic lens in such a way that it is made suitable for insertion in the eyewire,
    capturing a front-on image of the reworked ophthalmic lens,
    determining, in said front-on image, a reworked outline of said reworked ophthalmic lens, and
    correcting said coefficient depending on the difference between the reworked outline and the corrected outline.

* * * * *